United States Patent [19]

Stewart

[11] Patent Number: 4,593,878
[45] Date of Patent: Jun. 10, 1986

[54] ATTACHMENT DEVICE FOR RELATIVELY PERMANENTLY ATTACHING A STRUCTURE TO A SUPPORTING SURFACE

[75] Inventor: Robert Stewart, Redmond, Wash.

[73] Assignee: Wink Corporation, Lynnwood, Wash.

[21] Appl. No.: 319,994

[22] Filed: Nov. 6, 1981

[51] Int. Cl.[4] .............................................. F16M 13/00
[52] U.S. Cl. .................................... 248/549; 248/467; 248/205.3; 248/900; 350/631
[58] Field of Search ............ 248/549, 548, 467, 205.3, 248/900, D13, 906; 403/2; 350/631

[56] References Cited

U.S. PATENT DOCUMENTS

| 3,130,103 | 4/1964 | Mattimoe | 350/631 |
| 3,131,251 | 4/1964 | Ryan | 248/467 |
| 3,400,847 | 9/1968 | Stute | 248/205.3 |
| 3,425,657 | 2/1969 | Doyle | 403/2 |
| 3,589,662 | 6/1971 | Lagrange | 248/D13 |
| 4,212,094 | 7/1980 | Pray | 403/2 |
| 4,254,931 | 3/1981 | Aikens | 248/900 |
| 4,311,363 | 1/1982 | Marsaka | 248/467 |
| 4,377,626 | 3/1983 | Kunowski | 403/2 |

Primary Examiner—Reinaldo P. Machado
Assistant Examiner—Alvin Chin-Shue
Attorney, Agent, or Firm—Robert J. Schaap

[57] ABSTRACT

A rear view mirror device for relatively permanent attachment to a transparent support such as an automotive vehicle windshield. The rear view mirror device comprises a housing holding a light reflective member, such as a mirror, permitting a view rearwardly of the device, a pivoted arm extending rearwardly of the housing and a bracket adapted for attachment to the windshield. A bonding layer is located in the bracket and is rigidly adhered thereto. An intermediate member, such as a plastic layer, is incidental the opposite side of the bonding layer. Fracturable pins are integral with the bonding layer and extend into the intermediate member and which fracturable pins have ends which are adapted for attachment to a transparent support such as a windshield. These fracturable pins are constructed such that upon a high shear force applied to the rear view mirrow device and which high shear force is imposed upon the pins, they will fracture, thereby permitting separation of the bracket and from the transparent support. This bracket is also highly effective for relatively permanent attachment of any device to a glass or transparent supporting surface and which must separate therefrom upon application of a high shear force.

28 Claims, 12 Drawing Figures

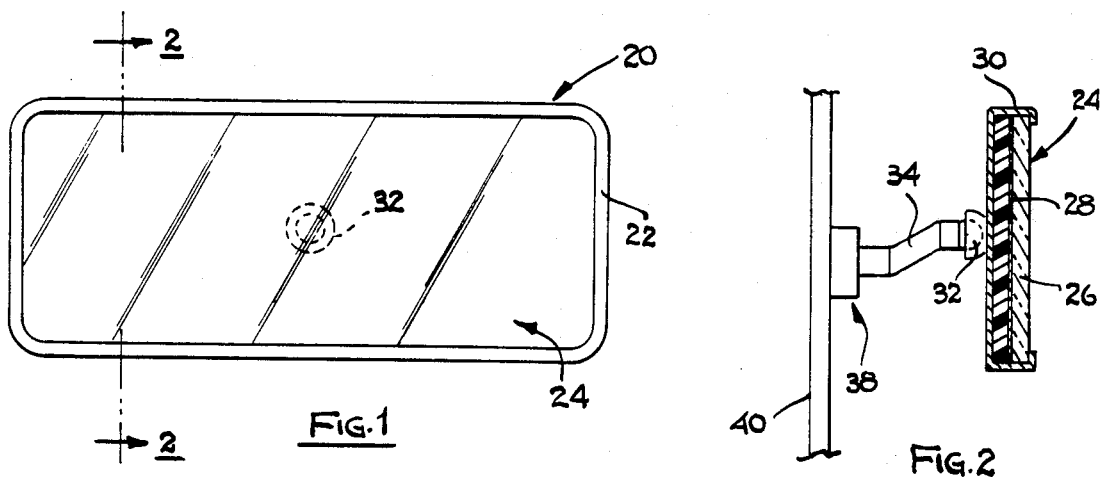
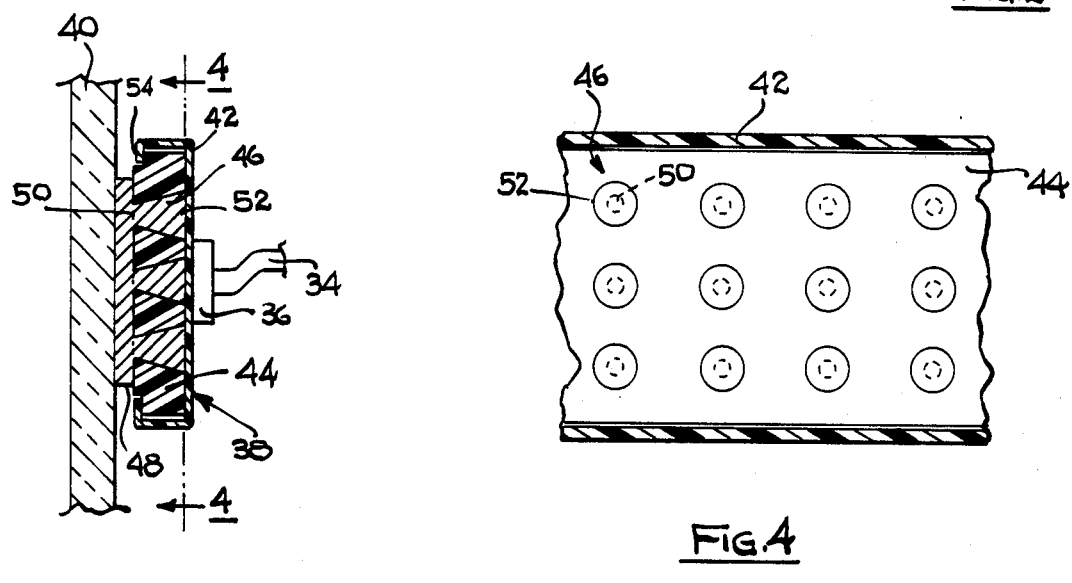
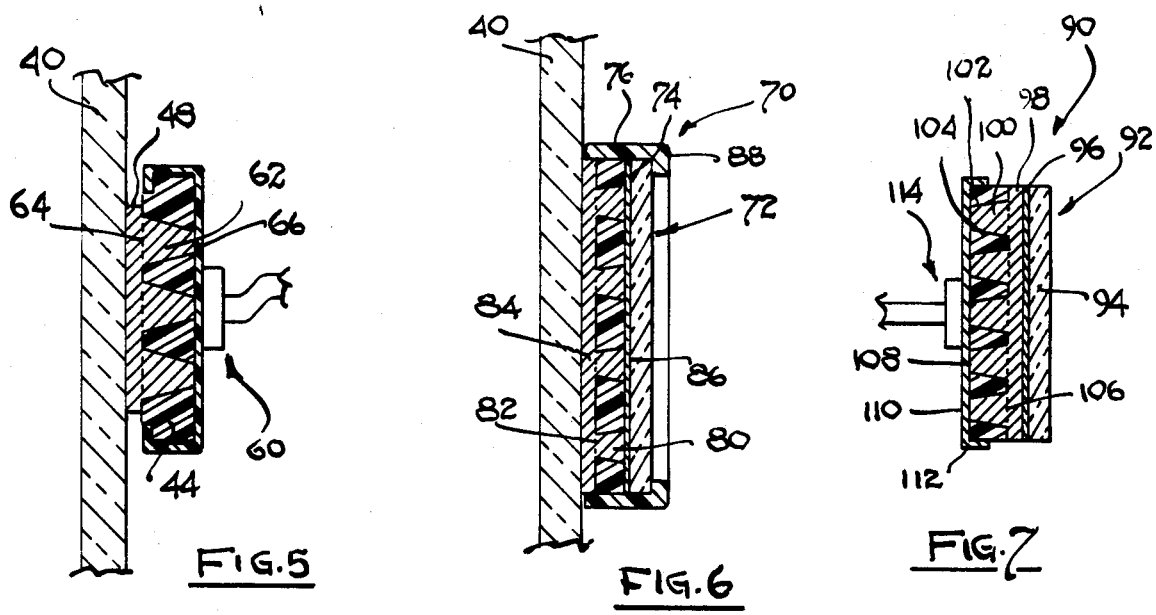

ATTACHMENT DEVICE FOR RELATIVELY PERMANENTLY ATTACHING A STRUCTURE TO A SUPPORTING SURFACE

BACKGROUND OF THE INVENTION

1. Field of the Invention

This invention relates in general to certain new and useful improvements in a means and method for relatively permanently attaching a member to a plastic or glass supporting surface in such manner that the member will separate therefrom when subjected to a high shear force, and more specifically, in one aspect, to a means and method of attaching a rear view mirror device to a transparent glass support in such manner that a high shear force applied to the device will permit separation from the transparent support.

2. Brief Description of the Prior Art

By governmental regulation, essentially all automotive vehicles such as automobiles, trucks and the like are required to have a rear view mirror device located within the cab or passenger compartment of the vehicle. In many cases, and with other forms of vehicles, such as aircraft, boats and the like, the rear view mirror devices are provided for safety purposes, whether or not pursuant to governmental regulation. Generally most vehicle rear view mirrors which are designed for location in the passenger compartment of the vehicle comprise a plate of glass coated with a reflective member such as a silver coating to form a mirror. This assembly is secured within a shell such as a metal frame or housing clipped around the periphery of the glass plate. This assembly is provided with an arm, usually pivotally mounted on the frame and the opposite end of the arm carries a bracket for attachment to the interior of the passenger compartment.

There are several safety considerations in the construction of these mirror devices. First of all, it is desirable to provide an assembly which will not permit the exposure of jagged or sharp edges of the glass in the event of a breakage. This is particularly important in the event of a collision where a person's head or other portion of the person in the vehicle might likely contact the jagged or broken edge of the glass in the event of such impact, whereby severe injury is likely to result.

In addition to the foregoing, it has been found that most automotive vehicle mirrors must be attached to a relatively permanent portion of the vehicle, other than the windshield. There have been several attempts to adhere the rear view mirror device to the automotive vehicle windshield. These attempts generally rely upon the use of an adhesive. However, as indicated above, most governmental regulations require the rear view mirror to shear or break away from the windshield in the event of a high shear force applied to the mirror device as a result of, for example, collision. This is designed to reduce the possibility of injury to the occupants of the vehicle. In any event, most of the adhesives heretofore applied were not effective for this purpose. The adhesive was not sufficient to hold the mirror on to the windshield against a relatively minor shear force. Otherwise, the adhesive was too strong and would not permit the mirror to break away from the windshield in the event that a high shear force, that is, a shear force beyond a desired threshold were applied to the mirror.

One of the principal problems in applying the mirror directly to the windshield is the fact that there has been no convenient means for attaching a plastic layer directly to a glass member such as the windshield itself. Further, and more importantly, when attaching this plastic layer forming part of the rear view mirror construction to the glass of the windshield, it it necessary to permit the rear view mirror device to break away from the windshield in the event of a high shear force applied thereto.

OBJECTS OF THE INVENTION

It is, therefore, a primary object of the present invention to provide a means and a method for relatively permanently attaching a device to a plastic or glass support and which will permit separation of the device from the glass or plastic support upon the application of a high shear force thereto.

It is another object of the present invention to provide a mirror device which can be relatively permanently attached directly to the interior surface of an automotive vehicle windshield and which is relatively permanently adhered thereto and which will also separate therefrom upon the application of a high shear force.

It is a further object of the present invention to provide a bracket device of the type stated which uses a plastic bonding layer and an intermediate plastic layer having fracturable pins formed with the bonding layer and which pins are designed for attachment to the plastic or glass support.

It is still another object of the present invention to provide a rear view mirror device of the type stated, which can be constructed in a wide variety of sizes and shapes to fit the design and aesthetics of a particular vehicle.

It is also an object of the present invention to provide a rear view mirror device of the type stated which has a bracket for attachment to the interior surface of an automotive vehicle windshield and which bracket has a plastic bonding layer and an intermediate plastic layer having the fracturable pins formed with the bonding layer, and which pins are designed for attachment to the interior surface of the windshield, and which pins will also shear upon the application of a high shear force.

It is another salient object of the present invention to provide a method for relatively permanently attaching a member to a glass or plastic supporting surface which includes the application of a bonding material to a plastic sheet and permitting the bonding material to flow through apertures in the plastic sheet forming fracturable pins and also permitting the opposing ends of the pins to be relatively permanently adhered to the glass or plastic supporting surface.

It is an additional object of the present invention to provide a method of making a rear view mirror device of the type stated which may be relatively permanently attached to the interior surface of an automotive vehicle windshield and which will separate therefrom upon the application of a high shear force.

With the above and other objects in view, my invention resides in the novel features of form, construction, arrangement and combination of parts presently described and pointed out in the claims.

BRIEF SUMMARY OF THE DISCLOSURE

The present invention, in a broad aspect, relates to a device for relatively permanently attaching a member or device, such as a bracket, to a supporting surface. The device comprises a plastic plate having at least one relatively flat surface thereon. In this respect, the flat surface is preferably one which does not have large grooves or surface irregularities therein. Thus, even a surface which may be curved or convolute is considered flat so long as it is relatively smooth.

Applied to this relatively flat surface of the plastic plate is a bonding layer which becomes rigidly bonded to this surface of the plastic plate. This bonding layer is formed of a material which is capable of bonding to a glass or plastic supporting surface, as for example, an automotive vehicle windshield.

Fracturable pins extend through the plastic plate and have first ends which communicate with the bonding layer and second ends at the opposite surface of the plastic plate. At least the second ends of the fracturable pins are formed of a material capable of bonding to a glass or plastic supporting surface. The second ends of the pins or the bonding layer is adapted for bonding to the supporting surface and thereby permits relatively permanent attachment to the supporting surface.

The device includes a relatively rigid element, as for example, a housing or a frame which may be physically coupled or connected to the plastic plate. In one embodiment, the housing or frame may be bonded to either the second ends of the pins or the bonding layer. In still another embodiment, the relatively rigid element may comprise a bracket housing having a groove or slot therein adapted to receive and retain the plastic plate.

The fracturable pins are constructed so that they will shear upon the application of a high shear force applied to the device. Preferably, the fracturable pins are integral with the bonding layer and are formed within the plastic plate when the bonding material, which is initially in a somewhat liquid state, becomes hardened. In other words, the bonding material when initially applied in a somewhat liquid state will flow through apertures formed in the plastic plate and when hardened, will form the fracturable pins. Preferably, the apertures formed in the plastic plate are tapered such that the fracturable pins which are formed will also have a tapered shape.

In another embodiment of the invention, the bracket forms part of the rear view mirror construction. The rear view mirror constructions which are used in automotive vehicles, typically have a reflective member such as a silver coated sheet of glass framed within a housing. These constructions are typically referred to as "mirrors", e.g. rear view mirrors, even though the mirror is only one element of the construction. An arm is pivotably secured to the housing and extends outwardly therefrom. The aforesaid bracket may be secured to the outer end of the arm for relatively permanent attachment to the interior surface of the automotive vehicle windshield and which is also capable of separating therefrom upon the application of a high shear force.

In still another embodiment of the present invention, the rear view mirror may be constructed so that the bonding layer is located on one side of the glass sheet which is used as the reflective member. In this way, the glass sheet may be rigidly adhered to an intermediate plastic sheet through the bonding layer. The fracturable pins which are formed in the plastic sheet may then be adhered directly to the interior surface of the automotive vehicle windshield. This form of construction may be desirable in some cases, where it is not necessary to pivotably move the mirror relative to an occupant of the vehicle using the same.

In still another aspect of the invention, there is provided a method for relatively permanently attaching a member to a glass or plastic supporting surface. This method comprises the application of the bonding material to one flat surface of the plastic plate having a plurality of spaced apart apertures therein and which bonding material is applied while it is in somewhat of a flowable or liquid state. The bonding material accumulates on the relatively flat surface to form a bonding layer thereon. The bonding material also flows into the apertures and forms the fracturable pins when hardened.

While in the liquid state, either the opposite ends of the fracturable pins or the bonding layer itself is adhered to the glass or plastic supporting surface and remains in contact until the bonding material becomes firmly adhered thereto. This construction also enables the separation of the member from the glass or plastic supporting surface by shearing of the fracturable pins upon the application of a high shear force.

This invention possesses many other advantages and has other purposes which may be made more clearly apparent from the consideration of forms in which it may be embodied. These forms are shown in the drawings accompanying and forming part of the specification. They will now be described in detail, for purposes of illustrating the general principals of the invention; but it is to be understood that such detailed descriptions are not to be taken in a limiting sense.

BRIEF DESCRIPTION OF THE DRAWINGS

Figure 8:
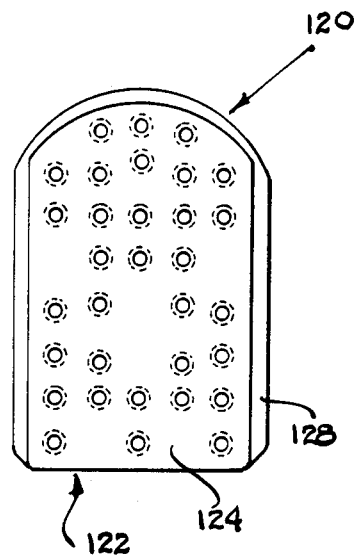
Figure 9:
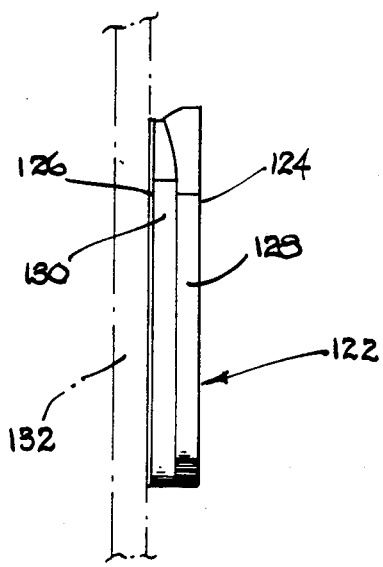
Figure 10:
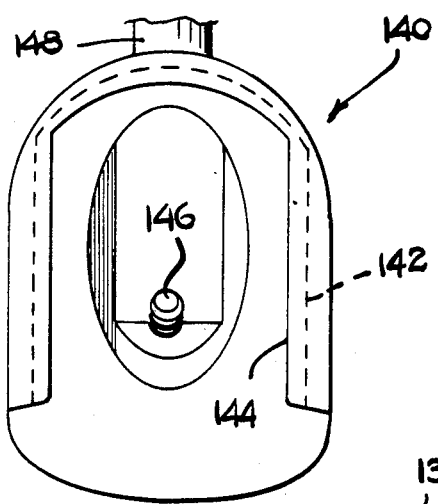
Figure 11:
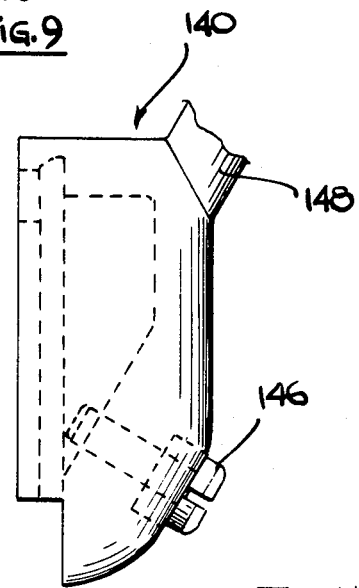
Figure 12:
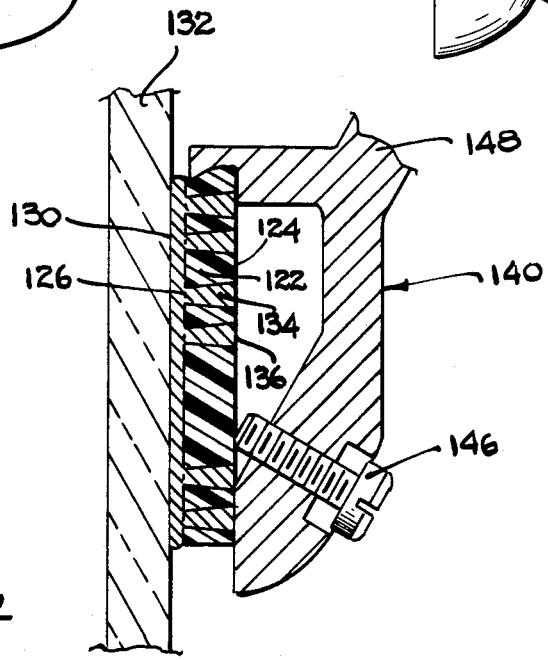

Having thus described the invention in general terms, reference will now be made to the accompanying drawings in which:

FIG. 1 is a front elevational view of a rear view mirror construction for use in automotive vehicles and which is constructed in accordance with and embodies the present invention;

FIG. 2 is a vertical sectional view taken along line 2—2 of FIG. 1;

FIG. 3 is an enlarged vertical sectional view showing a portion of a bracket for attaching the rear view mirror construction to a supporting surface, such as an automotive vehicle windshield;

FIG. 4 is a vertical sectional view taken along line 4—4 of FIG. 3;

FIG. 5 is a vertical sectional view, somewhat similar to FIG. 3, and showing a modified means for attaching the rear view mirror to a supporting surface;

FIG. 6 is a vertical sectional view of another automotive vehicle rear view mirror construction made in accordance with and embodying the present invention;

FIG. 7 is a vertical sectional view, similar to FIG. 6, of still another rear view mirror construction made in accordance with and embodying the present invention;

FIG. 8 is a front elevational view of one portion of a plate forming part of a bracket assembly made in accordance with and embodying the present invention;

FIG. 9 is a side elevational view of the plate of FIG. 8;

FIG. 10 is a front elevational view of a bracket used with the plate of FIG. 8 in the bracket assembly;

FIG. 11 is a side elevational view of the assembled bracket FIG. 10 plate of FIGS. 8 and 9; and FIG. 12 is a vertical sectional view showing the assembly of the bracket and the plate of FIGS. 8 and 10 in the assembled relationship.

DETAILED DESCRIPTION OF PREFERRED EMBODIMENTS

Referring now, specifically to FIGS. 1 and 2 of the drawings, 20 designates one embodiment of the rear view mirror construction which comprises an outer housing 22, in the form of a frame, typically made of metal, plastic, or the like. This outer housing, or Frame 22, generally encloses a mirror element 24, comprised of a glass sheet 26, or similar transparent sheet, having a silver backing 28. This silver backing 28 provides a light reflective coating to enable the mirror to function as a mirror device. Further, the mirror element 24 may be disposed against an intermediate, somewhat resilient, backing or cushioning layer 30, formed of a neoprene rubber or similar material. In addition, this neoprene rubber or cushioning material may actually function as a bonding or adhesive layer.

The cushioning layer 30 which also acts as a bonding or adhesive layer for adhering the mirror element 24 to the housing 22, may be any of a number of conventional polymers, normally used for bonding glass to a metal or plastic frame. As for example, acrylates or polyepoxy resins or other selected thermo-setting or thermoplastic resins, which also produce an air-tight seal may be used.

The backing material may also be a polyvinyl chloride or a polyvinyl acetate material, which are preferred since they retain flexibility even at low sub-zero temperatures. The vinyl is normally in the form of a vinyl plastisol that may be bonded by any conventional bonding agents.

Various forms of polymeric backing materials and combinations of bonding materials may be employed, so long as they have a certain degree of resiliency and flexibility. In this way, when an impact is applied to one end of the mirror assembly, the backing material 30 deflects resiliently with the glass plate of somewhat of an arcuate fashion rather than permanently bending and shearing the glass. Further, this polymeric backing material functions so that even if the glass plate does break, it will not shatter.

Mounted on the rear surface of the frame 22 is a socket assembly 32 and mounted within the socket assembly 32 through a swivel joint (not shown) is an outwardly extending arm 34. The swivel joints, which forms a part of the socket 32, is of well known construction and permit the arm 34 to be angulated in a large number of positions relative to the frame 22 for purposes of positioning the rear view mirror itself, with respect to an occupant of an automotive type vehicle.

One type of swivel joint which may be employed, for example, is more fully illustrated in U.S. Pat. No. 3,096,061, dated July 2, 1963.

As its rearward end, the arm 34 terminates in a mounting plate 36 which, in turn, is rigidly secured to a bracket assembly 38, the latter being more fully illustrated in FIGS. 3 and 4 of the drawings. By reference to FIG. 2, it can be observed that the bracket assembly 38 is provided for relatively permanent attachment to the interior surface of an automotive vehicle glass windshield 40. This attachment is such that the rear view mirror can "break away" from the vehicle windshield 40 as a result of the application of a high shear force to the rear view mirror construction 20, and in accordance with the construction of the bracket assembly 38 as hereinafter described in more detail.

Referring now to FIGS. 3 and 4, the bracket assembly 38 is generally comprised of a bracket casing 42. Located within the casing 42 is a relatively flat plastic plate 44 which is often referred to as an "intermediate" plate. The plate 44 is provided with a plurality of fracturable pins 46 which extend through the plate. The pins 44 are tapered from the left-hand or "first" end 50 toward the right-hand or "second" end 52, such that the second end which faces the interior surface of the casing 42 are diametrically enlarged with respect to the diametrically smaller first ends 50 and the latter of which are integral with the bonding layer 48.

As indicated above, the bonding layer 48 relatively permanently attaches the bracket assembly 38 to the interior surface of the automotive vehicle windshield 40. The casing 42 may fit around the intermediate plate and the fracturable pins in the manner as illustrated in FIG. 3, by means of crimped edges 54 as shown. However, and in like manner, the second ends 52 of the fracturable pins 46 can be bonded to the interior surface of the casing 42 in the manner as illustrated in FIG. 3. When a high-shear force is applied to the bracket assembly 38, that is a force which is in a plane parallel to the plane of the bonding layer 48, the pins will shear, typically at the first ends 50 adjacent to the bonding layer 48, thereby permitting separation of the bracket assembly 38 and hence the entire rear view mirror construction 20 from the automotive vehicle windshield 40.

In accordance with a preferred method of the present invention, the fracturable pins can be formed on an in-situ basis. The intermediate plastic plate 44 may be formed with tapered aperatures much in the same shape and size as the tapered pins 46. The casing 42 may then be crimped or otherwise retentively secured to the intermediate plastic plate 44. Thereafter, a bonding material is applied to the exposed surface of the plastic plate 44 and thereby creates the bonding layer 48. This bonding material, while initially in the liquid state, will flow into the tapered aperatures of the plate 44 and when hardened, will result in the pins 46 which are then integral with the bonding layer 48.

One of the most preferred materials for use in creating the bonding layer 48 and the fracturable pins 46 is a silicone material. This material is highly effective since it is capable of hardening to form the bonding layer and the pins and is also highly effective in bonding to glass or plastic substrates, as for example, the interior surface of the automotive vehicle windshield 40. The silicone rubber material or other bonding material which may be employed, should preferably be capable of withstanding adverse weather conditions, as for example, 100% relative humidity and temperatures within the range of minus 20 degrees F. to about 200 degrees F. Other materials which meet these characteristics and which are capable of creating fracturable pins when hardened and permitting shearing thereof, can also be used and include, for example, polypropylene resins, various vinyl materials, as for example, polyvinyl chloride, or polyvinyl acetate, various acrylates, epoxy resins, and the like.

FIG. 5 illustrates a modified form of bracket assembly 60 which is similar to the previously described bracket assembly 38. However, the bracket assembly 60 includes fracturable pins 62 which are tapered to have diametrically enlarged first ends 64 in integral contact with the bonding layer 48 and diametrically smaller second ends 66 extending to the other surface of the intermediate plastic plate 44. This type of bracket assembly operates in much the same manner as the bracket assembly 38, illustrated in FIG. 3 of the drawings. However, the bracket assembly 60, as illustrated in FIG. 5, requires a slightly greater degree of shear force to separate the fracturable pins 62 along the first end 64 due to the greater cross-sectional area thereof.

FIG. 6 illustrates a modified form of rear view mirror construction which may also be made in accordance with the present invention. The rear view mirror construction 70 generally comprises a mirror element 72 having a glass sheet 74 with a silver or similar light reflective backing 76. The mirrored element 72 is then disposed in face-wise engagement with one flat surface of a plastic intermediate plate 78. The plate 78 is similarly provided with tapered aperatures so as to create the formation of fracturable pins 80, much in the manner as illustrated and described in connection with bracket 38. In this case, the fracturable pins 80 have first ends 82 which are integral with a bonding layer 84 and second ends 86 which are bonded to the opposite surface of the silver or light reflective backing 76. The entire construction is then enclosed within an outer housing 88, in the form of a metal housing, a plastic housing or the like.

In accordance with the above outlined construction, it can be observed that the bonding layer 84 is adapted to relatively permanently bond the rear view mirror construction 70 to the interior surface of an automotive vehicle windshield 40. Moreover, the second ends 86 of the fracturable pins 80 rigidly bond the mirror element 72 to the one surface of the intermediate plate 78. Further, in accordance with this construction, if a high shear force is applied to the rear view mirror construction 70 in a plane which is generally parallel to the plane of the bonding layer 84, the pins 80 will sever at their first ends 82, thereby permitting separation of the rear view mirror construction 70 from the vehicle windshield 40.

It should be understood that the rear view mirror construction 70 could be attached to the interior surface of the windshield 40 much in the same manner as previously described. In other words, the bonding material could be applied to the one flat surface of the flat plastic plate 78 and flow in aperatures formed in the plastic plate 78 to thereby create the fracturable pins 80 and simultaneously cause a bonding of the plate 78 to the glass windshield 40.

The rear view mirror construction illustrated in FIG. 6 is highly effective in those cases where it is desirable to attach the rear view mirror construction directly to a vehicle windshield or other portion of the vehicle without the necessity of the swivel joint. This type of rear view mirror construction may be highly effective in those vehicles which employ a large number of side by side alligned rear view mirrors with each being angulated slightly relative to the next adjacent mirror, such that a desired wide angle view is obtained.

FIG. 7 illustrates another embodiment of a rear view mirror construction 90 which may also be made in accordance with the present invention. In this case, the rear view mirror construction 90 generally comprises a mirror element 92, having a glass sheet 94 and a silver or other light reflective backing 96. The mirror element 92 is rigidly bonded to an intermediate plastic plate 104 with the silver surface 96 being incidental to the bonding layer 98. Moreover, fracturable pins 100 are integral with the bonding layer 98 and extend into and through a plastic intermediate plate 104. In this way, the pins 100 have first ends 106 which are integral with the bonding layer 98 and second opposite ends which are diametrically reduced and which are in intimate bonding relationship with a flat wall 110 of an outer casing 112. Thus, it can observed that the mirrored element 92 is bonded to the plastic plate 104 which is, in turn, bonded to the ourter housing 112 through the fracturable pins 100.

When a shear force is imposed on any portion of the rear view mirror construction 90, the fracturable pins will break, either at their first ends 106 or their second ends 108, thereby permitting a separation of the rear view mirror construction from the housing 112. Further, the housing 112 may be provided on the exterior surface of the flat wall 110 with a swivel construction and arm assembly 114 in the manner as illustrated.

FIGS. 8-12 illustrate a modified form of bracket assembly 120 which may also be used in connection with the rear view mirror constructions of the present invention. In this respect, it should also be understood that the bracket assemblies are highly effective in attaching any form of object to a glass or plastic surface and particularly when that object is to be attached through another glass or plastic plate or intermediate member. It is realized in the prior art that it is extremely difficult to obtain a relatively permanent attachment between a plastic and a glass layer or between certain types of plastic layers and certain types of glass layers. Consequently, the bracket assemblies heretofor described and hereinafter described are highly effective for this purpose. While the bracket assemblies have been designed for use with and are highly effective in attaching rear view mirror constructions, they can nevertheless be used in attaching other objects to glass and plastic supporting surfaces.

The bracket assembly 120 generally comprises a flat, plastic intermediate plate 122 having a forwardly presented relatively flat surface 124 and a rearwardly presented relatively flat surface 126. Integrally formed with forwardly presented flat surface, and being contiguous therewith, is an outwardly extending mounting flange 128, which may be peripherally extending, or extend at least along both of the vertical edges and the upper edge of the plate 122, in the manner as illustrated in FIGS. 8 and 9.

A bonding layer 130 is applied to the interior face 126 of the intermediate plate 122 for rigidly bonding the intermediate plate 122 to a supporting surface 132, as for example, the interior surface of an automotive vehicle windshield. This bonding layer 130 may adopt the form of any of the bonding materials as previously described.

By further reference to FIG. 12, it can be observed that the bonding layer 130 is integral with tapered fracturable pins 134. Then pins 134 have first ends 132 integral with the bonding layer 130, and second outer ends 136. Thus, in the event of a high shear force applied to the bracket assembly 120, the pins 134 will fracture typically at the first ends 132 thereby permitting separation of the bracket 120 and any object carried thereby from the supporting surface 132.

These fracturable pins 134 are basically integral with the bonding layer 130 and formed of the same bonding material. Moreover, they can be formed in the same manner as previously described. In essence, the bonding material 130 could be provided in a dry form, as for example, in a package which may be diluted with a liquid carrier for purposes of creating a somewhat flowable binder solution. The liquid carrier could also be supplied along with the bracket assembly. Thereafter, the user could mix the liquid carrier with the solid resin and pour the same into the apertures formed in the plastic plate and also permitting the bonding layer 130 on one flat surface to be adhered to some supporting surface. When the material dries, that is, when the liquid carrier evaporates, the bonding layer will become rigidly attached to the supporting surface and the fracturable pins will become integral with the bonding layer and which will fracture upon the application of a high shear force. In like manner, it should be understood that a small container of a somewhat liquid resin could also be supplied along with the bracket assembly. This construction is highly effective in that it enables a relatively unskilled user to unskilled user to attach the bracket assembly to essentially any suitable supporting surface.

Also provided with the bracket assembly 120 is a bracket housing 140 which is more fully illusrated in FIGS. 10 and 11 of the drawings. The bracket housing is constructed in such manner that it includes an interior groove 142 generally conforming to the enlarged flange 128 on the plate 122. This groove 142, formed with the bracket housing 140, may be created by an inwardly constructed flange 144 on the housing 140, as best illustrated in FIG. 10 of the drawings. In this way, the bracket housing 140 may be slipped over the flange 128 on the plate 122, when the latter has been secured to a supporting surface. Thus, after the plate 122 has been rigidly bonded, to a supporting surface, the bracket housing 140 may be located at the upper end of the plate 122 and permitted to slide downwardly such that the flange 128 extends into the groove 142.

The bracket housing 140 may be rigidly attached to the plate 122 by means of a screw 146 which extends through the housing 140, in the manner as illustrated in FIGS. 10 and 11. Thus, by tightening the screw, it can be observed that the screw will bear against the exterior flat surface 124 of the plate 122. In this way, the bracket housing is prevented from downward movement as a result of the groove and flange assembly at the upper end and is prevented from upward movement by means of the screw 146. For this purpose, it is preferable to have the screw 146 angulated slightly, such that it bears against the plate 122 in the direction as shown.

The bracket housing in 140 is also integrally provided with an outwardly extending stub-arm 148 for purposes of attachment to a mirror construction or other construction.

Thus, there has been illustrated and described a unique and novel rear view mirror device and method of construction and relies upon means and method of adhering to a glass or plastic surface on a highly efficient basis and which therefore fulfills all of the objects and advantages sought therefore. It should be understood that many changes, modifications, variations and other uses and applications of the devices and the method of the present invention will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A device for relatively permanent attachment of a member to a supporting surface, said device comprising:

(a) a plastic plate having at least one relatively flat surface thereon and an opposite surface thereon and a plurality of apertures extending between said surfaces, (b) a bonding layer on said one relatively flat surface of said plastic plate and being rigidly bonded thereo, said bonding layer being formed of a material capable of adhesively bonding to a glass or plastic supporting surface for relatively permanent attachment thereto, (c) a plurality of generally parallel fracturable pins formed of the same material as said bonding layer and being integral therewith, said fracturable pins extending through said apertures in said plastic plate, said pins being generally perpendicular to said bonding layer and communicating with said bonding layer and having first and second ends with first ends at said bonding layer and the second ends at an opposite surface of said plastic plate, and (d) a relatively rigid element forming part of said device, said fracturable pins being constructed so that upon application of a high shear force to said device, said pins will fracture at common ones of the ends thereof permitting separation and disattachment of at least said relatively rigid element from said supporting surface, said pins being generally closely spaced to one another and present in an amount and relative spacing so that each of said pins will fracture upon application of said high shear force of a predetermined amount, said relatively rigid element being adapted to operatively retain a member to be relatively permanently attached to said supporting surface and which is separated therefrom when said pins fracture.

2. The device of claim 1 further characterized in that said fracturable pins are tapered.

3. The device of claim 1 further characterized in that said fracturable pins are tapered and have the first ends of smaller cross-sectional area than the second ends.

4. The device of claim 1 further characterized in that said fracturable pins are tapered and have the first ends of larger cross-sectional area than the second ends.

5. The device of claim 1 further characterized in that said first ends of said pins are the ends which will fracture upon application of said high shear force of a predetermined amount.

6. The device of claim 1 further characterized in that said bonding layer is adapted for relatively permanent attachment to said supporting surface, and the second ends of said pins are adapted for relatively permanent attachment to said relatively rigid element.

7. The device of claim 1 further characterized in that said rigid element comprises a bracket which holds said plastic plate and bonding layer and fraturable pins, said bracket having means to carry said member.

8. The device of claim 7 further characterized in that said bracket comprises an outer casing having a groove therein, said groove being sized to receive and retain said plastic plate.

9. The device of claim 7 further characterized in that said member is a rear view mirror adapted for use in the operator compartment of an automotive type vehicle.

10. The device of claim 9 further characterized in that said second ends of said pins are bonded to said bracket.

11. The device of claim 10 further characterized in that said bonding material is a silicon material.

12. A rear view mirror device for relatively permanent attachment to a transparent support, said device comprising:
  (a) a light reflective member capable of enabling a view rearwardly by a viewer looking into said reflective member,
  (b) a relatively rigid plate located with respect to and adapted to assist in the holding of said light reflective member and having a plurality of holes therein which extend therethrough,
  (c) a bonding layer operatively located on one side of said relatively rigid plate and being rigidly bonded thereto, said bonding layer being formed of a material capable of bonding to a plastic or glass supporting surface for relatively permanent attachment thereto,
  (d) a plurality of generally parallel fracturable pins formed of the same material as said bonding layer and being integral therewith, said fracturable pins extending outwardly from said bonding layer and extending through said holes in said rigid plate in generally perpendicular relationship to said bonding layer said pins having first end integral with said bonding layer, and
  (e) said fracturable pins and bonding layer adapted to enable relatively permanent attachment of said relatively rigid plate to said transparent support, said fracturable pins being constructed and presented in an amount and relative spacing such that upon a force applied to said device which results in a high shear force on said pins and which exceeds a predetermined amount, the pins will fracture at common ends thereof permitting separation and dis-attachment of said light reflective member with respect to said transparent support.

13. The device of claim 12 further characterized in that said fracturable pins are tapered.

14. The device of claim 13 further characterized in that the bonding layer is formed of a silicon material.

15. The device of claim 13 further characterized in that said light reflective member is comprised of a glass sheet having a mirrored surface.

16. The device of claim 13 further characterized in that said fracturable pins are tapered outwardly and extend outwardly from said bonding layer through said relatively rigid plate.

17. The device of claim 16 further characterized in that said fracturable pins have opposite ends distal to said transparent support and which the ends have a larger cross-sectional area than opposite ends at said bonding layer.

18. The device of claim 13 further characterized in that said first ends of said pins are integral with said bonding layer and the first ends of the pins are the ends which will fracture upon application of said high shear force of a predetermined amount.

19. A device for relatively permanent attachment of a member to a supporting surface, said device comprising:
  (a) a plastic plate having first and second opposite relatively flat surfaces thereon with holes extending therethrough,
  (b) a bonding layer on one flat surface of said plastic plate and being rigidly bonded thereto, said bonding layer being formed of a material capable of adhesively bonding to a supporting surface for relatively permanent attachment thereto,
  (c) a plurality of generally parallel fracturable pins formed of the same material as said bonding layer and being integral therewith, said fracturable pins extending through the holes of said plastic plate having first ends terminating at the first surface of said plate and second ends at the second surface of said plastic plate, said pins being generally perpendicularly disposed to said bonding layer, and
  a relatively rigid element forming part of said device, said fracturable pins being constructed and being present in an amount and relative spacing so that upon application of a high shear force to said device which results in a high shear force on said pins which exceeds a predetermined amount, said pins will fracture at said first ends thereof permitting separation of at least said relatively rigid element from said supporting surface, said relatively rigid element being adapted to operatively retain a member to be relatively permanently attached to said supporting surface.

20. The device of claim 19 further characterized in that said fracturable pins are tapered.

21. The device of claim 20 further characterized in that said fracturable pins are tapered and have the first ends of smaller cross-sectional area than the second ends.

22. The device of claim 20 further characterized in that said fracturable pins are tapered and have the first ends of larger cross-sectional area than the second ends.

23. The device of claim 20 further characterized in that said rigid element comprises a bracket which holds said plastic plate and fracturable pins, said bracket having means to carry said member.

24. The device of claim 23 further characterized in that said member is a rear view mirror adapted for use in the operator compartment of an automotive type vehicle.

25. A rear view mirror device for relatively permanent attachment to a transparent supporting surface, said rear view mirror device comprising:
  (a) a plastic plate having at least one relatively flat surface thereon and an opposite surface thereon and a plurality of apertures extending therethrough between said surfaces,
  (b) a bonding layer on said one relatively flat surface of said plastic plate and being rigidly bonded thereto, said bonding layer being formed of a material capable of adhesively bonding to a glass or plastic supporting surface for relatively permanent attachment thereto,
  (c) a rear view light reflective member operatively connected to another relatively flat surface of said plastic plate and being carried by said plastic plate, said rear view light reflective member capable of enabling a view rearwardly by a viewer looking in said reflective member,
  (d) a plurality of generally parallel fracturable pins formed of the same material as said bonding layer and being integral therewith, said fracturable pins extending through said apertures in said plastic plate, said pins being generally perpendicular to said bonding layer and having first and second ends with the first end integral with said bonding layer and the second ends at an opposite surface of said plastic plate, and
  (e) a relatively rigid element forming part of said device, said fracturable pins being generally closely spaced to one another and constructed and present in an amount and relative spacing so that upon application of a high shear force of at least a predetermined amount to said device, each of said pins will fracture at common ones of the ends thereof permitting separation and dis-attachment of at least said relatively rigid element and the light reflective member carried by said device.

26. The device of claim 25 further characterized in that said fracturable pins are tapered.

27. The device of claim 25 further characterized in that said fracturable pins are tapered and have the first ends integral with said bonding layer and said first ends are the ends which fracture upon application of a high shear force to said device.

28. A rear view mirror device for relatively permanent attachment to an interior supporting surface of an automotive vehicle windshield glass, said rear view mirror device comprising:
 (a) a plastic plate having at least one relatively flat surface thereon and an opposite surface thereon and a plurality of apertures extending therethrough betwen said surfaces,
 (b) a bonding layer on said one relatively flat surface of said plastic plate and being rigidly bonded thereto, said bonding layer being formed of a material capable of adhesively bonding to a glass or plastic supporting surface for relatively permanent attachment thereto,
 (c) a rear view light reflective member operatively connected to another relatively flat surface of said plastic plate and being carried by said plastic plate, said rear view light reflective member capable of enabling a view rearwardly of a viewer looking in said reflective member,
 (d) a plurality of generally parallel fracturable pins extending through said apertures in said plastic plate formed of the same material as said bonding layer, said pins being generally perpendicular to said bonding layer and having first ends integral with said bonding layer and second ends at an opposite surface of said plastic plate, said fracturable pins being tapered so that one of the first or second ends have smaller cross-sectional size than the other ends, and
 (e) a relatively rigid element forming part of said device, said fracturable pins being constructed and present in an amount and relative spacing so that upon application of a high shear force of at least a predetermined amount to said device, each of said pins will fracture at the first ends thereof permitting separation and dis-attachment of at least said relatively rigid element and the rigid reflective member carried by said device.

* * * * *